(12) United States Patent
Jung

(10) Patent No.: US 11,036,468 B2
(45) Date of Patent: Jun. 15, 2021

(54) HUMAN-COMPUTER INTERFACE FOR NAVIGATING A PRESENTATION FILE

(71) Applicant: MICROSOFT TECHNOLOGY LICENSING, LLC, Redmond, WA (US)

(72) Inventor: Christopher Andrews Jung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 16/208,869

(22) Filed: Dec. 4, 2018

(65) Prior Publication Data
US 2020/0174745 A1 Jun. 4, 2020

(51) Int. Cl.
*G06F 3/16* (2006.01)
*G10L 15/22* (2006.01)
*G10L 15/26* (2006.01)

(52) U.S. Cl.
CPC .............. *G06F 3/167* (2013.01); *G10L 15/22* (2013.01); *G10L 15/26* (2013.01); *G10L 2015/225* (2013.01)

(58) Field of Classification Search
CPC ..... G06F 33/167; G10L 15/22; G10L 15/265; G10L 2015/225
USPC ....................................................... 704/275
See application file for complete search history.

(56) References Cited

U.S. PATENT DOCUMENTS

| 6,774,920 B1 | 8/2004 | Cragun et al. |
| 2013/0226576 A1* | 8/2013 | Jaiswal .................. G10L 13/033 |
| | | 704/235 |
| 2015/0132735 A1* | 5/2015 | Edge ...................... G06Q 10/10 |
| | | 434/308 |
| 2016/0124909 A1 | 5/2016 | Basson et al. |
| 2017/0075656 A1 | 3/2017 | Ehlen et al. |
| 2018/0059796 A1 | 3/2018 | Carr et al. |

OTHER PUBLICATIONS

International Search Report and Written Opinion Issued in PCT Application No. PCT/US19/063130, dated Apr. 1, 2020, 15 Pages.

* cited by examiner

*Primary Examiner* — Quynh H Nguyen
(74) *Attorney, Agent, or Firm* — Newport IP, LLC; Jacob P. Rohwer

(57) ABSTRACT

An application can provide a UI that includes UI elements for defining talking points to be discussed in conjunction with slides in a presentation file. The application can also provide a UI for assisting a user while the user is making a presentation using a presentation file for which talking points have been defined. For example, the application can recognize the speech of a presenter during a presentation and identify topics within the recognized speech. The application can then identify the talking points that the presenter has discussed based upon their identified topics. The application can also provide a presenter view UI that includes UI elements that display data identifying the talking points that have not been recognized within the user's speech during the presentation. In this way, a presenter can quickly identify the talking points that they have covered and those that they have not covered in real-time.

14 Claims, 9 Drawing Sheets

HUMAN-COMPUTER INTERFACE FOR NAVIGATING A PRESENTATION FILE

BACKGROUND

Presentation programs provide functionality for helping presenters to create and give presentations. For example, presentation program programs commonly provide functionality for defining presentation slides, organizing slides, defining presenter notes for use during presentation of the slides, and providing a presenter-only view showing the presenter notes during a presentation. Presentation program programs can provide many other types of functionality.

Despite the numerous features provided by presentation programs, making presentations in front of a live audience remains a difficult and commonly stressful experience for many presenters. As a result, presenters routinely fail to discuss talking points that they originally intended to discuss during presentations. For instance, due to stress, anxiety, distraction, time limitations, or other factors, a presenter might fail to mention important talking points during a presentation.

In an attempt to ensure that no talking points were missed during a presentation, presenters commonly review the slides of a presentation at the conclusion of the presentation. Similarly, if a presenter realizes during a presentation that they failed to discuss a talking point with reference to a previous slide, they will commonly page back through the presentation to the relevant slide for reference when discussing the missed talking point. In some cases, a presenter does not realize they have missed a talking point until the presentation has completed.

Paging back and forth through the slides of a presentation in the manner described above can be distracting to the audience and result in an unorganized and disjointed presentation. Moreover, paging back and forth through a presentation file in this manner can result in rendering and re-rendering of slides in a presentation file, which can consume computing resources such as computing cycles, memory, storage space, and power.

It is with respect to these and other technical challenges that the disclosure made herein is presented.

SUMMARY

An improved human-computer interface ("HCI") is disclosed herein for navigating a presentation file. As will be described in greater detail below, the disclosed HCI can reduce or eliminate the need for presenters to page back and forth through slides in presentation files to determine whether they have discussed their intended talking points. As a result, the disclosed HCI can reduce or eliminate the unnecessary utilization of computing cycles, memory, storage space, and power caused by this activity. Other technical benefits not specifically mentioned herein can also be realized through implementations of the disclosed subject matter.

In order to realize the technical benefits mentioned briefly above, a presentation program, or another type of application used to facilitate the creation and giving of a presentation, can provide a user interface ("UI") that includes UI elements for defining talking points to be discussed in conjunction with slides in a presentation file. Talking points are topics or pieces of information that a presenter wants to discuss during a presentation.

The UI can also provide UI elements for associating talking points with a particular slide, or slides, with reference to which the talking points are to be discussed. UI elements might also be provided to enable a user to specify talking points that are to be discussed at any point during a presentation rather than with reference to a particular presentation slide. Data identifying the talking points and their associated slide, or slides, if any, can be stored in the presentation file or in another location.

The presentation program can also provide functionality for assisting a user while the user is making a presentation using a presentation file for which talking points have been defined. In one configuration, for example, the presentation program, or another component, can recognize the speech of a presenter during a presentation and identify topics within the recognized speech. The topics recognized within the user's speech can then be compared to the talking points that the user previously defined for the presentation file. In this way, the presentation program, or other component, can identify the talking points that the presenter has discussed and the talking points that the presenter has not discussed at any point in the presentation in real-time.

The presentation program can also provide a presenter view UI that is shown to the presenter during the presentation. The presenter view UI can include UI elements that display data identifying the talking points that have not been recognized within the user's speech during the presentation. The presenter view UI can also include UI elements that display data identifying the talking points that have been recognized within the user's speech during the presentation. In this way, the presenter can see in real-time those talking points that they have covered and those talking points that they have not covered at any point during or after a presentation.

In some configurations, the presenter view UI can display UI elements showing those talking points associated with a particular slide that have not been discussed by the presenter. In this manner, a presenter can determine whether they have failed to discuss a talking point associated with a particular slide, thereby preventing the presenter from moving to the next slide without discussing the talking point. In this way, the presenter will not later have to page back to the slide to discuss the missed talking point, or points.

The presenter view UI might also provide a summary with or following the last slide of a presentation file identifying the talking points that the presenter did not discuss during the entire presentation. UI elements might also be presented identifying the slide, or slides, with reference to which the talking points were to be discussed. Selection of such a UI element can cause the associated slide of the presentation file to be presented in some configurations. In this manner, if a presenter fails to discuss a talking point during a presentation, the presenter can navigate back to the relevant slide with a single selection rather than paging back and forth in the presentation file to find the slide associated with the missed talking point.

In some configurations, a presenter's voice can also be utilized to navigate between slides in a presentation file. For instance, a presenter might say "go back to the slide where I discussed talking point A." In this example, the presentation program, or another component, can recognize the presenter's command and display the slide at which the presenter discussed the specified talking point. In another example, the presenter's voice might also be utilized to advance the slides of a presentation file to coincide with the talking points discussed by the presenter. A presenter's voice can be utilized to navigate the slides of a presentation file in other ways in other configurations.

As discussed briefly above, implementations of the technologies disclosed herein can provide a tangible technical benefit by reducing or eliminating the unnecessary utilization of computing cycles, memory, storage space, and power caused by navigation of presentation files due to the failure to discuss a talking point, or points, during a presentation. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
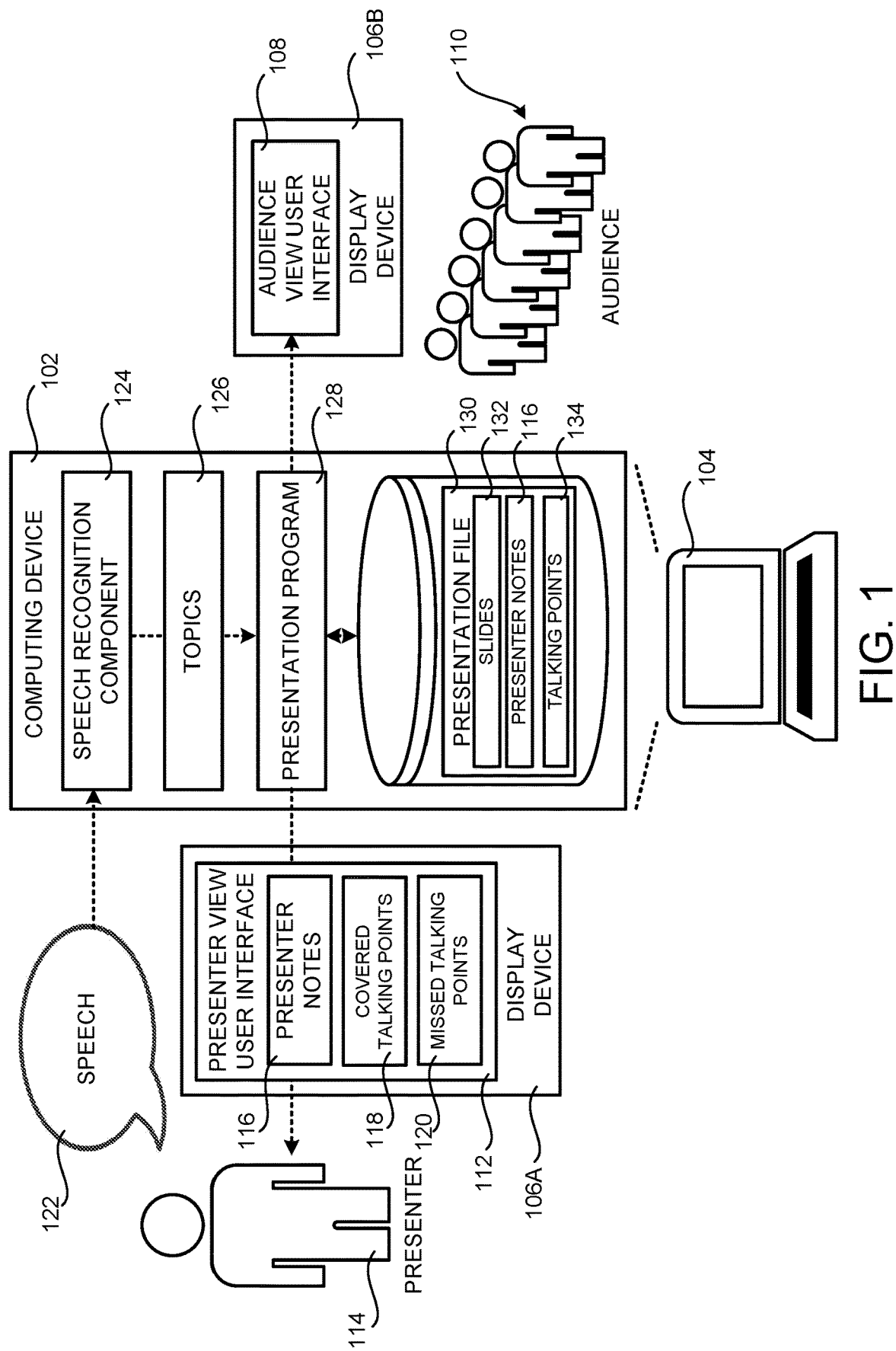
FIG. 1 is a computing architecture diagram that shows aspects of the configuration and operation of a computing device disclosed herein for improved navigation of a presentation file.

The following detailed description is directed to technologies for providing an improved HCI for navigating a presentation file. As discussed briefly above, and in greater detail below, the disclosed HCI can reduce or eliminate the need for presenters to page back and forth through slides in presentation files to determine whether they have discussed talking points. As a result, the disclosed HCI can reduce or eliminate the unnecessary utilization of computing cycles, memory, storage space, and power caused by this activity. Other technical benefits not specifically mentioned herein can also be realized through implementations of the disclosed subject matter.

While the subject matter described herein is presented in the general context of a laptop or desktop computing system executing a presentation program, those skilled in the art will recognize that other implementations can be performed in combination with other types of computing devices and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), mini-computers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of technologies for providing an improved HCI for navigating a presentation file will be described.

FIG. 1 is a computing architecture diagram that shows aspects of the configuration and operation of a computing device 102, such as a laptop computer 104, disclosed herein for improved navigation of a presentation file. As illustrated in FIG. 1, the computing device 102 can be configured to execute a presentation program 128. As discussed briefly above, the presentation program 128 provides functionality for creating a presentation file 130. The presentation file 130 can include data 132 defining slides (which might be referred to herein as "slides 132"), data 116 defining presenter notes (which might be referred to herein as "presenter notes 132"), data 134 defining talking points (which might be referred to herein as "talking points 132"), and other types of information.

The presentation program 128 can also provide functionality for facilitating the giving of a presentation based on the presentation file 130. For example, and without limitation, the computing device 102 can be configured with two display devices 106A and 106B. In one configuration, the computing device 102 can provide an audience view UI 108 shown on the display device 106B. The audience view UI 108 includes a view of the slides 132 of the presentation file 130. The presenter 114 of the presentation file 130 can select the slide 132 that is presented in the audience view UI 108.

The presentation program 128 can also provide a presenter view UI 112 on the display device 106A. The presenter view UI 112 is typically visible only to the presenter 114 during a presentation and is not visible to the audience 110. As shown in FIG. 1, the presenter view UI 112 can include various types of information to assist the presenter 114 while giving a presentation. For example, the presenter view UI 112 might include thumbnail images (not shown in FIG. 1) of the current slide 132 (i.e. the slide being currently shown in the audience view UI 108) of the presentation file 130, the previous slide of the presentation file 130 (i.e. the last slide that was shown in the audience view UI 108), and the next slide 132 in the presentation file 130.

The presenter view UI 112 can also include other types of information including, but not limited to, presenter notes 116. The presenter notes 116 are notes defined by the creator of the presentation file 130 (e.g. the presenter 114) and can include information for reference by the presenter 114 during a presentation.

In some configurations, the presentation program 128 can also provide a UI (not shown in FIG. 1) that includes UI elements for defining talking points 134. As mentioned briefly above, talking points 134 are topics or pieces of information that a presenter 114 wants to discuss during a presentation based on a presentation file 130. Additional details regarding several illustrative UIs for defining the talking points 134 will be provided below with regard to FIGS. 2A-2C.

The presentation program 128 can also provide functionality for assisting a presenter 114 while the presenter 114 is making a presentation using a presentation file 130 for which talking points 134 have been defined. In one configuration, for example, the presentation program 128, a speech recognition component 124, or another component, can recognize the speech 122 of a presenter 114 in real-time during a presentation and generate data 126 identifying topics (which might be referred to herein as "topics 126") within the recognized speech.

The topics 126 recognized within the user's speech 122 can be compared to the talking points 134 previously defined for the presentation file 130. In this way, the presentation program, 128, or other component, can identify in real-time the talking points 134 that the presenter 114 has discussed and the talking points 134 that the presenter 114 has not discussed during their presentation.

The presenter view UI 112 can also include UI elements that display data 120 (which might be referred to herein as "missed talking points 120") identifying the talking points 134 of the presentation file 130 that have not yet been recognized within the presenter's speech 122 during their presentation. The presenter view UI 112 can also include UI elements that display data 118 (which might be referred to herein as "covered talking points 118") identifying the talking points 134 defined for the presentation file 130 that have been recognized within the presenter's speech 122 during the presentation. In this way, the presenter 114 can see, in real-time, those talking points 134 that they have covered and those talking points 134 that they have not covered at any point during or following a presentation.

In some configurations, the presenter view UI 112 can display UI elements showing those talking points 134 associated with a particular slide 132 that have not yet been discussed by the presenter 114. In this manner, a presenter 114 can determine whether they have failed to discuss a talking point 134 associated with a particular slide 132, thereby enabling the presenter 114 to refrain from moving to the next slide 132 without discussing the talking point 134 associated with the current slide 132. In this way, the presenter 114 will not later have to page back to the slide 132 to discuss the missed talking point 134, or points. Additional details regarding such a UI will be provided below with regard to FIG. 3.

The presenter view UI 112 might also provide a summary with or following the last slide 132 of a presentation file 130 identifying the talking points 134 that the presenter 114 did not discuss during their entire presentation. UI elements might also be presented identifying the slide 132, or slides 132, with reference to which the talking points 134 were to be discussed. Selection of such a UI element can cause the associated slide 132 of the presentation file 130 to be displayed in some configurations. In this manner, if a presenter 114 fails to discuss a talking point 134 during a presentation, the presenter 114 can navigate back to the relevant slide 132 with a single selection rather than paging back and forth in the presentation file 130 to find the slide 132 associated with the missed talking point. Additional details regarding such a UI will be provided below with regard to FIG. 4.

In some configurations, a presenter's voice can also, or alternately, be utilized to navigate between slides 132 in a presentation file 130. For instance, a presenter 114 might say "go back to the slide where I discussed talking point A." In this example, the presentation program 128, a speech recognition component 124, or another component, can recognize the presenter's speech, extract the command and the talking point, and display the slide 132 at which the presenter 114 discussed the specified talking point 134. In another example, the presenter's voice might also be utilized to advance the slides 132 of a presentation file 130 to coincide with the talking points 134 discussed by the presenter. A presenter's voice can be utilized to navigate the slides 132 of a presentation file 130 in other ways in other configurations.

Figure 2A:
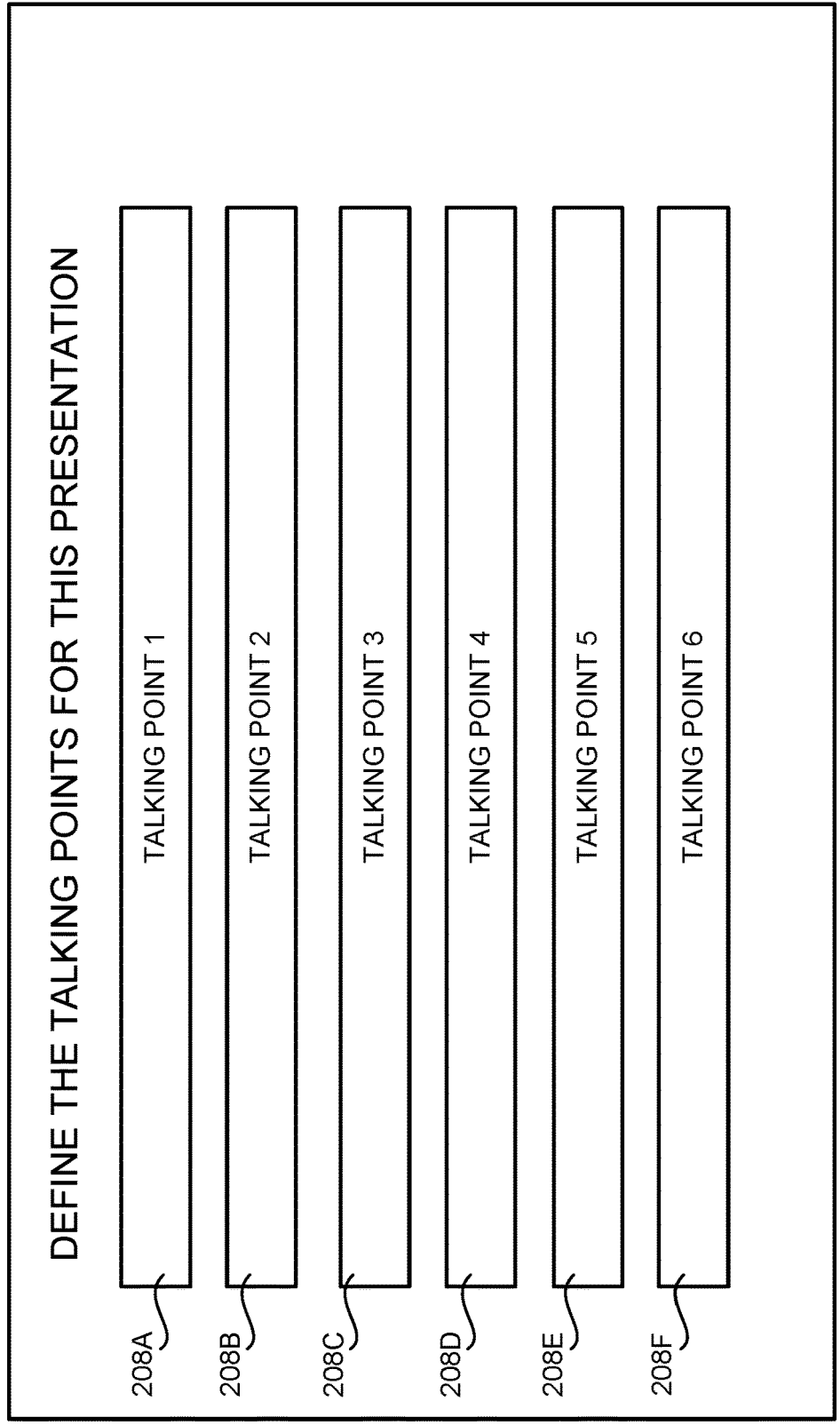
FIG. 2A is a user interface diagram that shows aspects of one illustrative UI disclosed herein for defining talking points for a presentation file.

FIG. 2A is a user interface diagram that shows aspects of one illustrative UI 200A disclosed herein for defining talking points 134 for a presentation file 130. In the example UI 200A shown in FIG. 2A, UI elements 208A-208F can be used to specify talking points 134 that are to be discussed at any point during a presentation rather than with reference to a particular presentation slide 132. The UI elements 208A-208F can be any type of UI element suitable for receiving text such as, but not limited to, text boxes. Data defining the talking points 134 specified through the use of the UI elements 208A-208F can be stored in the presentation file 130 or in another location accessible to the presentation program 128.

Figure 2B:
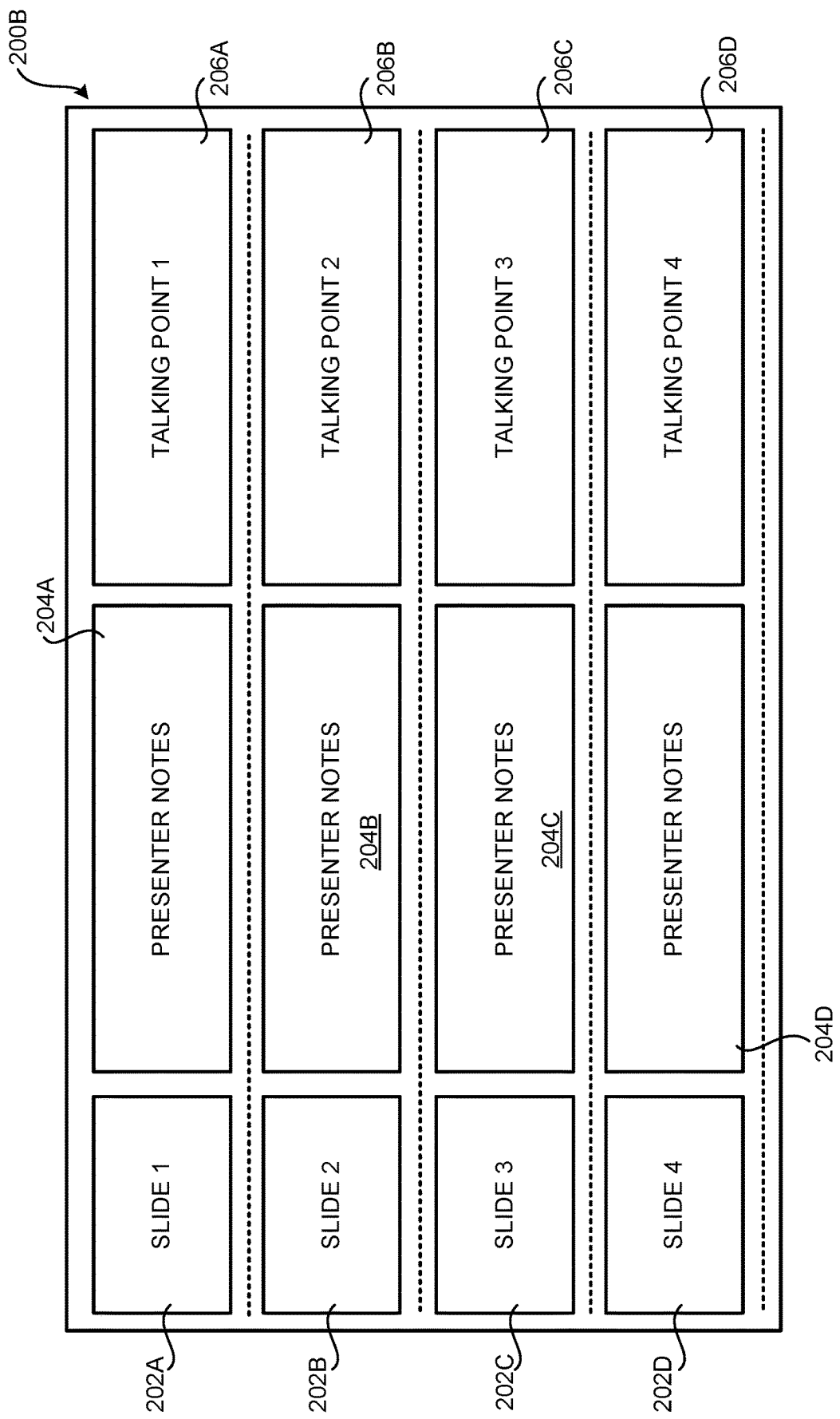
FIG. 2B is a user interface diagram that shows aspects of another illustrative UI disclosed herein for defining talking points for a presentation file.

FIG. 2B is a user interface diagram that shows aspects of another illustrative UI 200B disclosed herein for defining talking points 134 for a presentation file 130. The UI 200B provides functionality for allowing a user to associate talking points 134 with slides 132 with reference to which the talking points are to be made. In order to provide this functionality, the illustrative UI 200B includes UI elements 202A-202D that present a preview of the slides 132. For instance, the UI elements 202A-202D might be implemented as thumbnail images of the slides 132.

UI elements 204A-204D can be presented adjacent to the UI elements 202A-202D, respectively. The UI elements 204A-204D can be utilized to define presenter notes 116. The UI elements 204A-204D can be any type of UI element suitable for receiving text such as, but not limited to, text boxes. Data defining the presenter notes 134 specified through the use of the UI elements 204A-20D can be stored in the presentation file 130 or in another location accessible to the presentation program 128.

The UI elements 204A-204D enable a user to specify presenter notes 116 for the slide 132 represented by the adjacent UI element 202A-202D, respectively. For example, the UI element 204A can be used to specify presenter notes 116 associated with the slide 132 represented by the UI element 202A. Similarly, the UI element 204B can be used to specify presenter notes 116 that are associated with the slide 132 represented by the UI element 202B, and so on.

The UI 200B can also be used to define talking points 134 for a presentation file 130. In particular, the UI elements 206A-206D can be utilized to define talking points 134 that are associated individual slides 132 in a presentation file 130. The UI elements 206A-206D can be any type of UI element suitable for receiving text such as, but not limited to, text boxes. Data defining the talking points 134 specified through the use of the UI elements 206A-206D can be stored in the presentation file 130 or in another location accessible to the presentation program 128.

As shown in FIG. 2B, the UI elements 206A-206D are adjacent to the UI elements 204A-204D which are, in turn, adjacent to the UI elements 202A-202D, respectively. In this configuration, the UI element 206A can be utilized to define talking points 134 for the slide 132 represented by the UI element 202A. Similarly, the UI element 206B can be utilized to define talking points 134 that are associated with the slide 132 represented by the UI element 202B, and so on.

Figure 2C:
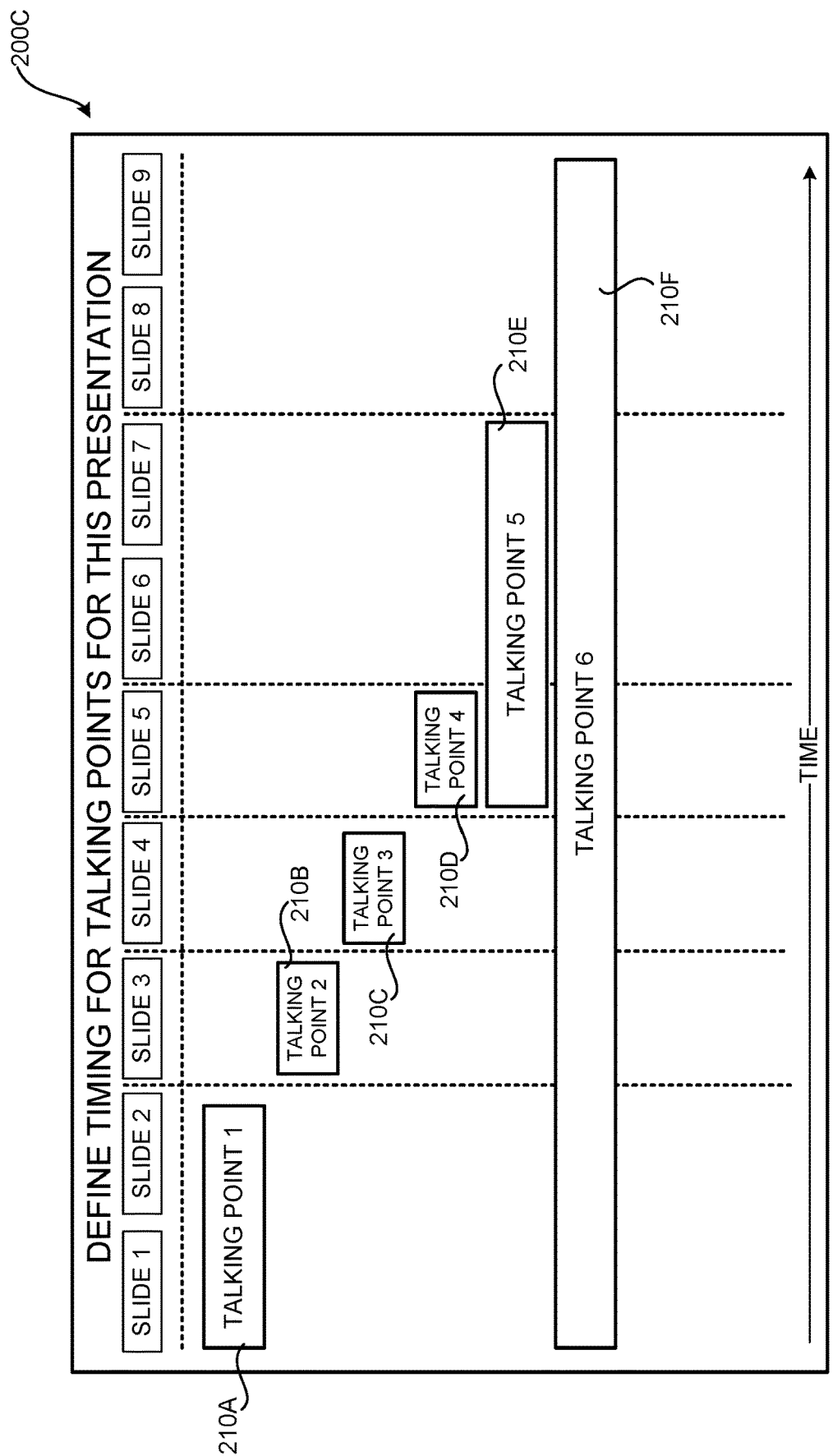
FIG. 2C is a user interface diagram that shows aspects of a third illustrative UI disclosed herein for defining talking points for a presentation file.

FIG. 2C is a user interface diagram that shows aspects of a third illustrative UI 200C disclosed herein for defining talking points 134 for a presentation file 130. The example UI 200C shown in FIG. 2C includes a timeline that identifies the slides 132 in the presentation file 130. In particular, UI elements are placed along the top of the UI 200C that include text identifying the slides 132.

In the example shown in FIG. 2C, UI elements 210A-210F are also placed in the timeline at positions corresponding to slides 132 in the presentation file 130 with which they are associated. The UI elements 210A-210F can be any type of UI element suitable for receiving text such as, but not limited to, text boxes.

The UI elements 210A-201F can also be resized and re-positioned within the timeline to specify the slides 132 in the presentation file 130 with which the corresponding talking points 134 are associated. In the example shown in FIG. 2C, for instance, the UI element 210A has been sized and positioned to indicate that the associated talking points 134 are associated with the first and second slides 132 in the presentation file 130. The UI element 210B has been sized and positioned to indicate that the associated talking points 134 are associated with the third slide 132 in the presentation file 130.

In the example shown in FIG. 2C, the UI element 210C has been sized and positioned to indicate that the associated talking points 134 are associated with the fourth slide 132 in the presentation file 130. The UI element 210D has been sized and positioned to indicate that the associated talking points 134 are associated with the fifth slide 132 in the presentation file 130. The UI element 210E has been sized and positioned to indicate that the associated talking points 134 are associated with the fifth through seventh slides 132 in the presentation file 130. The UI element 210D has been sized and positioned to indicate that the associated talking points 134 are associated with the first through ninth slide 132 in the presentation file 130. The configuration of the UI element 210F might be utilized to indicate that the associated talking points 134 can be made at any point during the presentation (i.e. with reference to any slide).

By associating talking points 134 with particular slides 132 in the manner described above with regard to FIGS. 2B and 2C, a user can specify the slides with reference to which particular talking points are to be made during the presentation. As will be described in greater detail below, speech recognition can be utilized to determine whether talking points associated with a particular slide 132 have been made during a presentation. Additional details regarding this process will be provided below with regard to FIGS. 3 and 5.

In some configurations, the talking points shown in the UI elements 206, 208, and 210 can be pre-populated by performing a topic analysis on the presenter notes 116 defined for the presentation file 130. When presenter notes 116 have been associated with a particular slide 132, or slides 132, such as in the manner described above with regard to FIG. 2A, the presenter notes 116 for a particular slide 132 can be analyzed to generate talking points for that slide. Topics identified in the presenter notes 116 can then be inserted into the UI elements 206, 208, and 210 as talking points 134. A user can then edit the talking points 134 in the UI elements 206, 208, and 210, if necessary.

It is to be appreciated that the UIs 200A, 200B, and 200C shown in FIGS. 2A-2C and the other UIs described below are merely illustrative. UIs having different numbers, types, and arrangements of UI elements can be utilized to define talking points 134 for a presentation file 130 and for individual slides 132 in a presentation file 130.

Figure 3:
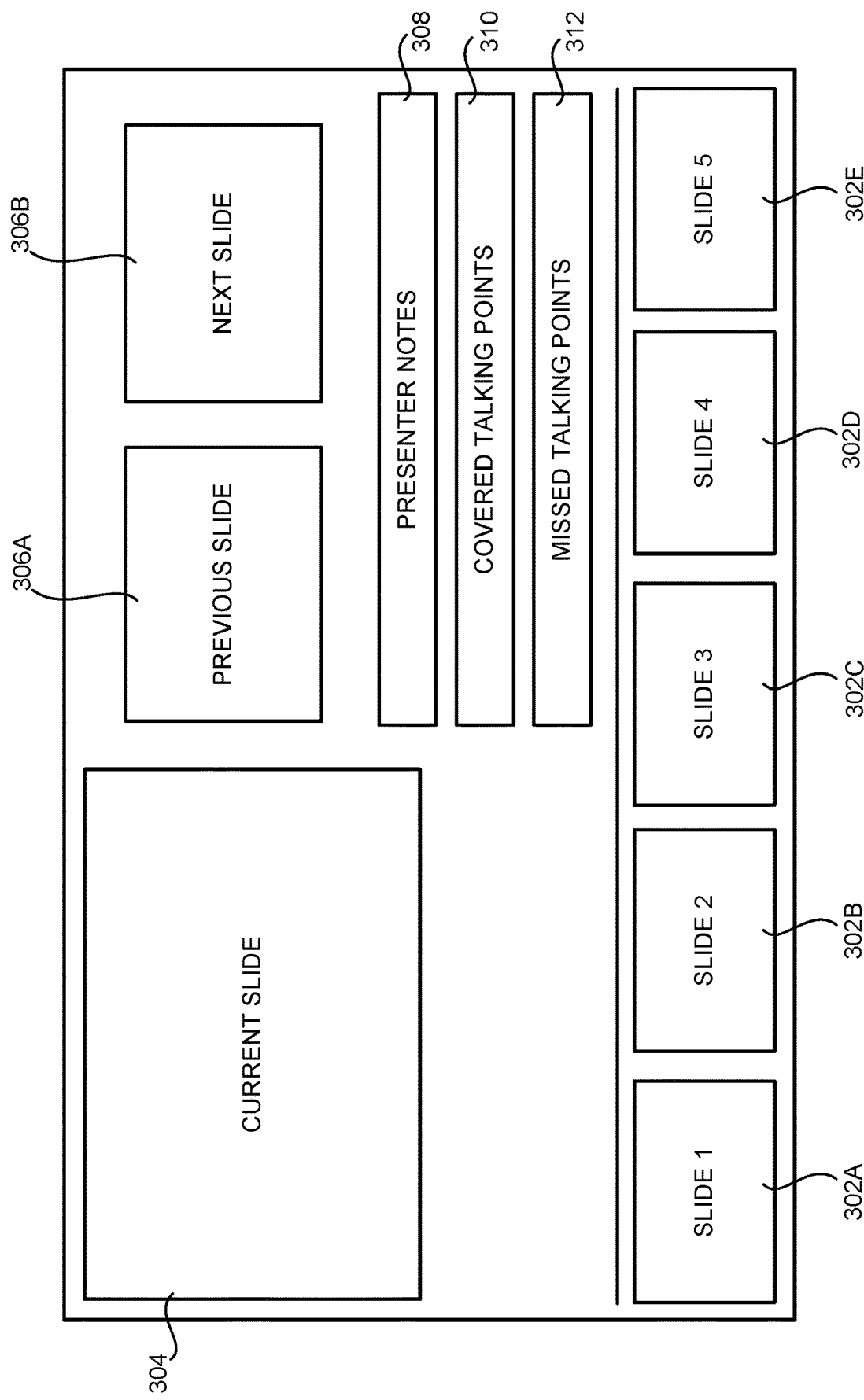
FIG. 3 is a user interface diagram that shows aspects of an illustrative presenter view UI disclosed herein.

FIG. 3 is a user interface diagram that shows aspects of an illustrative presenter view UI 112 disclosed herein. This configuration of the presenter view UI 112 can include UI elements 302A-302E (e.g. thumbnail images) showing the slides 132 of the presentation file. The illustrated configuration of the presenter view UI 112 can include a UI element 304 (e.g. a thumbnail image) showing the current slide 132 (i.e. the slide being currently shown in the audience view UI 108) of the presentation file 130, a UI element 306A (e.g. a thumbnail image) showing the previous slide 132 of the presentation file 130 (i.e. the last slide that was shown in the audience view UI 108), and a UI element 306B (e.g. a thumbnail image) showing the next slide 132 in the presentation file 130. The configuration of the presenter view UI 112 shown in FIG. 3 can also include a UI element 308 showing the presenter notes 116, if any, that are associated with the current slide 132.

Figure 4:
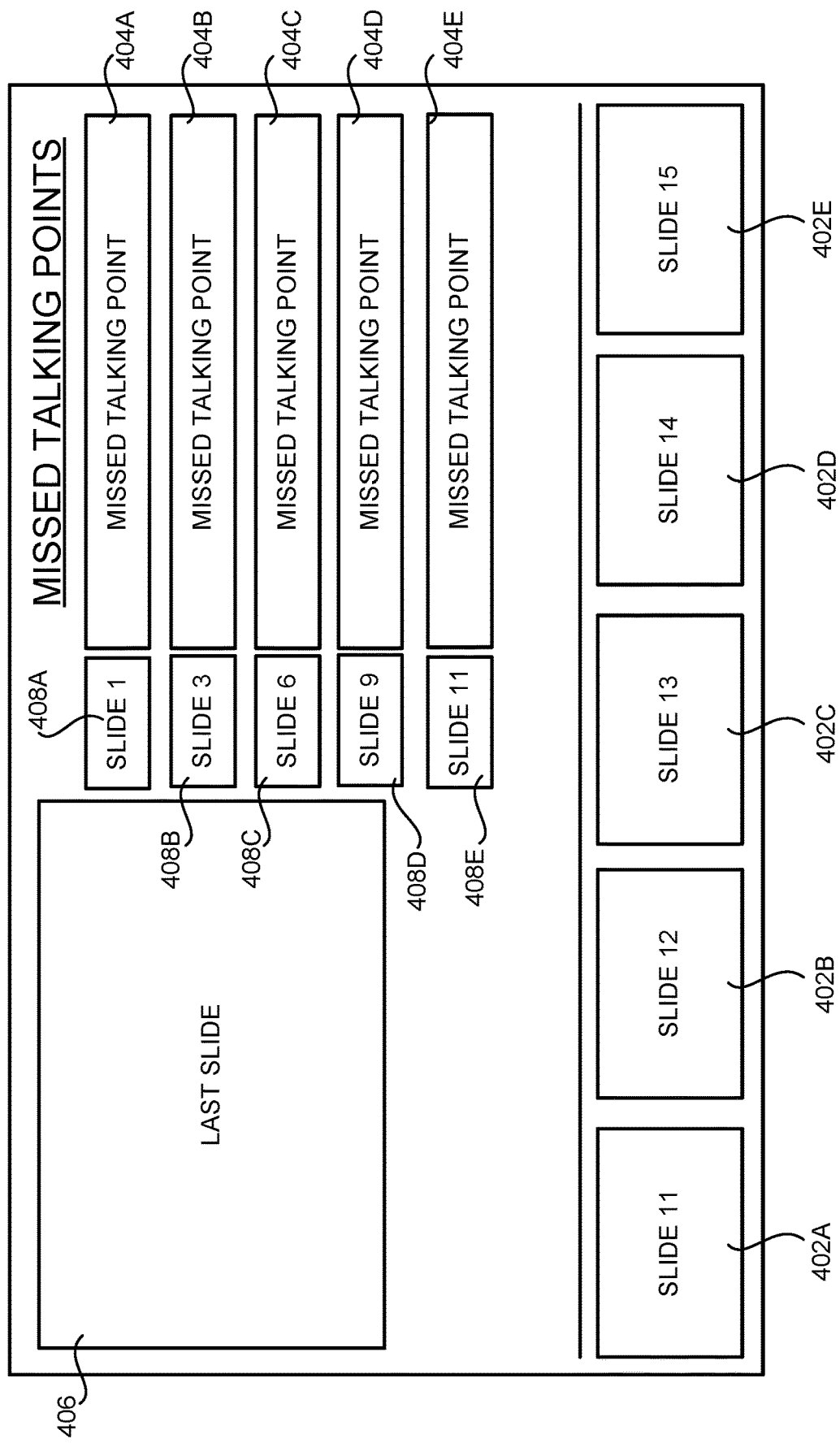
FIG. 4 is a user interface diagram that shows aspects of another illustrative presenter view UI disclosed herein.

The illustrative presenter view UI 112 shown in FIG. 4 can also display UI elements 312 showing those talking points 134 associated with the current slide 132 of the presentation file 130 that have not yet been discussed by the presenter 114 (i.e. the missed talking points 120 for the current slide 132). Similarly, the illustrative presenter view UI 112 shown in FIG. 4 can display UI elements 310 showing those talking points 134 associated with the current slide 132 of the presentation file 130 that the presenter 114 has discussed with reference to the current slide 132 (i.e. the covered talking points 118 for the current slide 132). In this manner, a presenter 114 can determine at a glance whether they have failed to discuss a talking point 134 associated with a particular slide 132, thereby preventing the presenter 114 from moving to the next slide 132 without discussing the talking point 134 associated with the current slide 132. In this way, the presenter 114 will not later have to page back to the slide 132 to discuss the missed talking point 134, or points 134.

FIG. 4 is a user interface diagram that shows aspects of another illustrative presenter view UI 112 disclosed herein. The presenter view UI 112 shown in FIG. 4 provides a summary of the talking points 134 that a presenter 114 did not discuss during their entire presentation. The presenter view UI 112 shown in FIG. 4 would typically be displayed at the conclusion of a presentation (e.g. after the last slide 132 in a presentation file 130 has been displayed).

The configuration of the presenter view UI 112 shown in FIG. 4 can include UI elements 402A-402E (e.g. thumbnail images) showing the slides 132 of the presentation file 130. This configuration of the presenter view UI 112 can also include a UI element 306B (e.g. a thumbnail image) showing the last slide 132 in the presentation file 130.

The illustrative presenter view UI 112 shown in FIG. 4 can also include UI elements 404A-404E identifying the missed talking points 120 for the entire presentation. This configuration of the illustrative presenter view UI 112 can also include UI controls 408A-408E that identify the slide 132, or slides 132, with reference to which missed talking points 120 were to be discussed. For example, the UI element 408A indicates that a talking point 134 associated with the first slide 132 in the presentation file 130 was missed. The adjacent UI element 404A identifies the missed talking point 120 for the first slide. Similarly, the UI element 408D indicates that a talking point 134 associated with the ninth slide 132 in the presentation file 130 was missed. The adjacent UI element 404D identifies the missed talking point 120 for the ninth slide, and so on.

The UI elements 408A-408E can also be selected such as, for example, using a touch screen or another type of user input device. Selection of such one of the UI elements 408A-408E will cause the associated slide 132 of the presentation file 130 to be displayed in some configurations. For instance, if the UI control 408C is selected, the sixth slide 132 in the presentation file 130 will be displayed. In this manner, if a presenter 114 fails to discuss a talking point 134 during a particular slide 132 in a presentation, the presenter 114 can navigate back to the relevant slide 132 with a single selection rather than paging back and forth in the presentation file 130 to find the slide 132 associated with the missed talking point.

Figure 5:
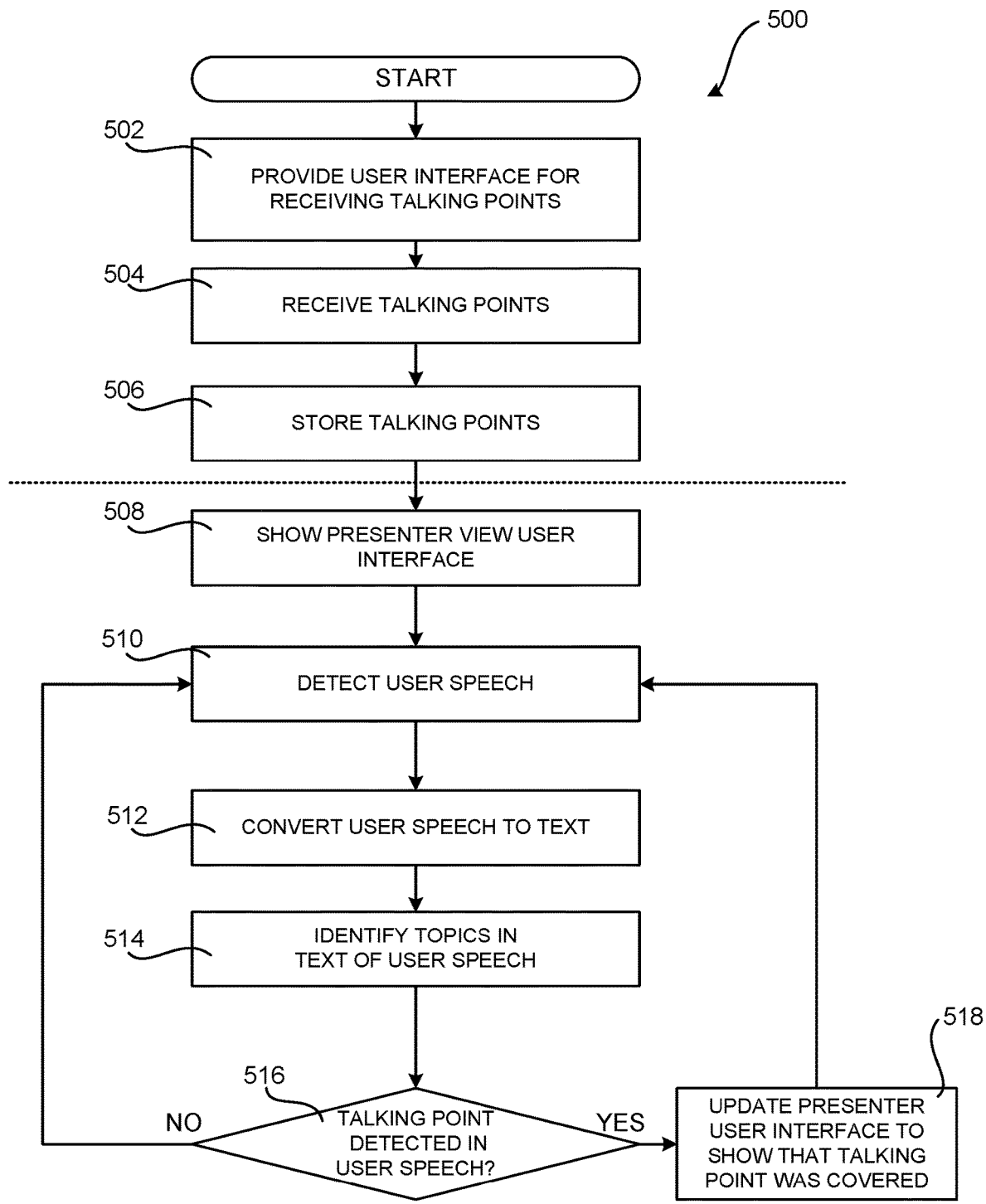
FIG. 5 is a flow diagram showing a routine that illustrates aspects of the operation of the computing device described with reference to FIGS. 1-4 for providing improved navigation of a presentation file.

FIG. 5 is a flow diagram showing a routine 500 that illustrates aspects of the operation of the computing device described above with reference to FIGS. 1-4 for providing improved navigation of a presentation file, according to one embodiment disclosed herein. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where a computing device 102 provides a UI for defining talking points 134. Examples of such UIs include, but are not limited to, the UIs 200A, 200B, and 200C described in detail above with regard to FIGS. 2A-2C, respectively. From operation 502, the routine 500 proceeds to operation 504, where the talking points 134 are received through the UI. As discussed above, talking points 134 can be associated with an individual slide 132, or slides 132, or an entire presentation. Once the talking points 134 have been received, the routine 500 proceeds from operation 504 to operation 506, where the talking points 134 are stored in the presentation file 130 or in another location accessible to the presentation program 128.

From operation 506, the routine 500 proceeds to operation 508, where a computing device 102 shows a presenter view UI 112, such as that described above with regard to FIG. 3, during a presentation. From operation 508, the routine 500 proceeds to operation 510, where the presentation program 128, a speech recognition component 124, or another component detects the speech 122 of a presenter 114. In response thereto, the routine 500 proceeds from operation 510 to operation 512, where the presentation program 128, the speech recognition component 124, or another component converts the speech 122 to text.

From operation 512, the routine 500 proceeds to operation 514, where the presentation program 128, the speech recognition component 124, or another component analyzes the recognized speech to identify topics 126 mentioned in the user's speech 122. In this regard, it is to be appreciated that various types of topic models can be generated for the recognized speech to identify the topics contained therein. Examples of such topic models include, but are not limited to, i-vector models, explicit semantic analysis, latent semantic analysis, and latent Dirichlet allocation.

From operation 514, the routine 500 proceeds to operation 516, where the computing device 102 compares the topics 126 recognized in the speech 122 to the talking points 134 for a current slide or the entire presentation. Based upon the comparison, the computing device 120 can identify those talking points 134 that the user has mentioned and those talking points 134 that the user has not mentioned. If talking points are not detected in the speech 122, the routine 500 proceeds back to operation 510, where additional speech 122 can be processed in the manner described above.

If a talking point 134 is detected in the user speech 122, the routine 500 proceeds from operation 516 to operation 518, where the computing device 102 can update the presenter view UI 112 to show that a talking point was covered by the presenter. For example, the UI element 310 shown in FIG. 3 might be updated to indicate that a talking point 134 was made with respect to a particular slide. Similarly, the recognized talking point 134 can be removed from the UI element 312. In this way, the user can see in real-time those talking points 134 that have been covered and those that have not. At the end of a presentation, a UI such as that shown in FIG. 4 can be displayed by the computing device 102 so that the presenter 114 can determine if any talking points were missed during the entire presentation.

Figure 6:
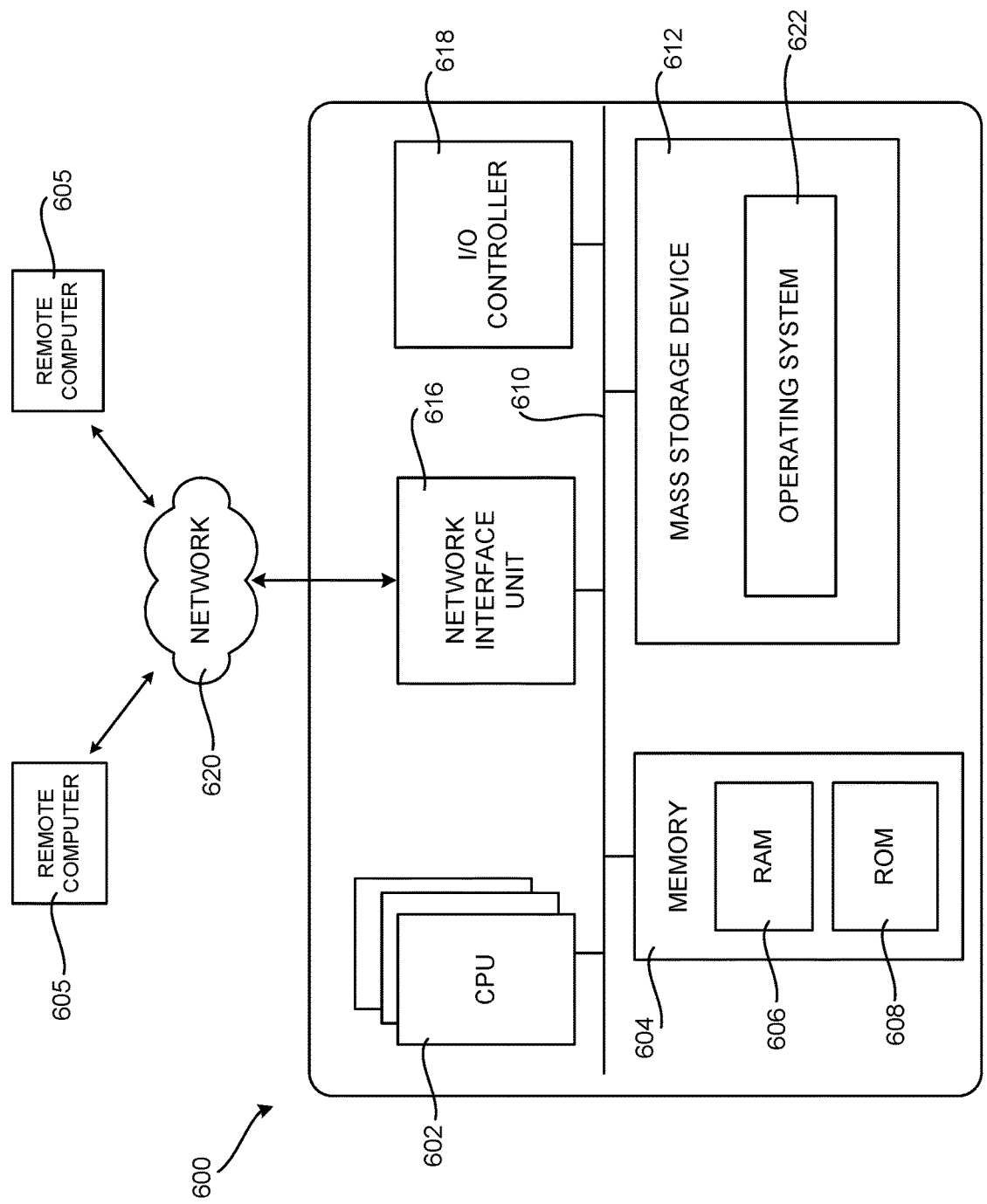
FIG. 6 is a computer architecture diagram showing an illustrative computer hardware and software architecture for a computing device that can implement the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an AR/VR device, a tablet computer, a laptop computer, or another type of computing device.

The computing device 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computing device 600, such as during startup, can be stored in the ROM 608. The computing device 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computing device 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," and variations thereof, does not include waves or signals per se or communication media.

According to various configurations, the computing device 600 can operate in a networked environment using logical connections to remote computers 605 through a network such as the network 620. The computing device 600 can connect to the network 620 through a network interface unit 616 connected to the bus 610. It should be appreciated that the network interface unit 616 can also be utilized to connect to other types of networks and remote computer systems. The computing device 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computing device 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 600 in order to store and execute the software components presented herein. It also should be appreciated that the architecture shown in FIG. 6 for the computing device 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computing device 600 might not include all of the components shown in FIG. 6, can include other components that are not explicitly shown in FIG. 6, or can utilize an architecture completely different than that shown in FIG. 6.

Figure 7:
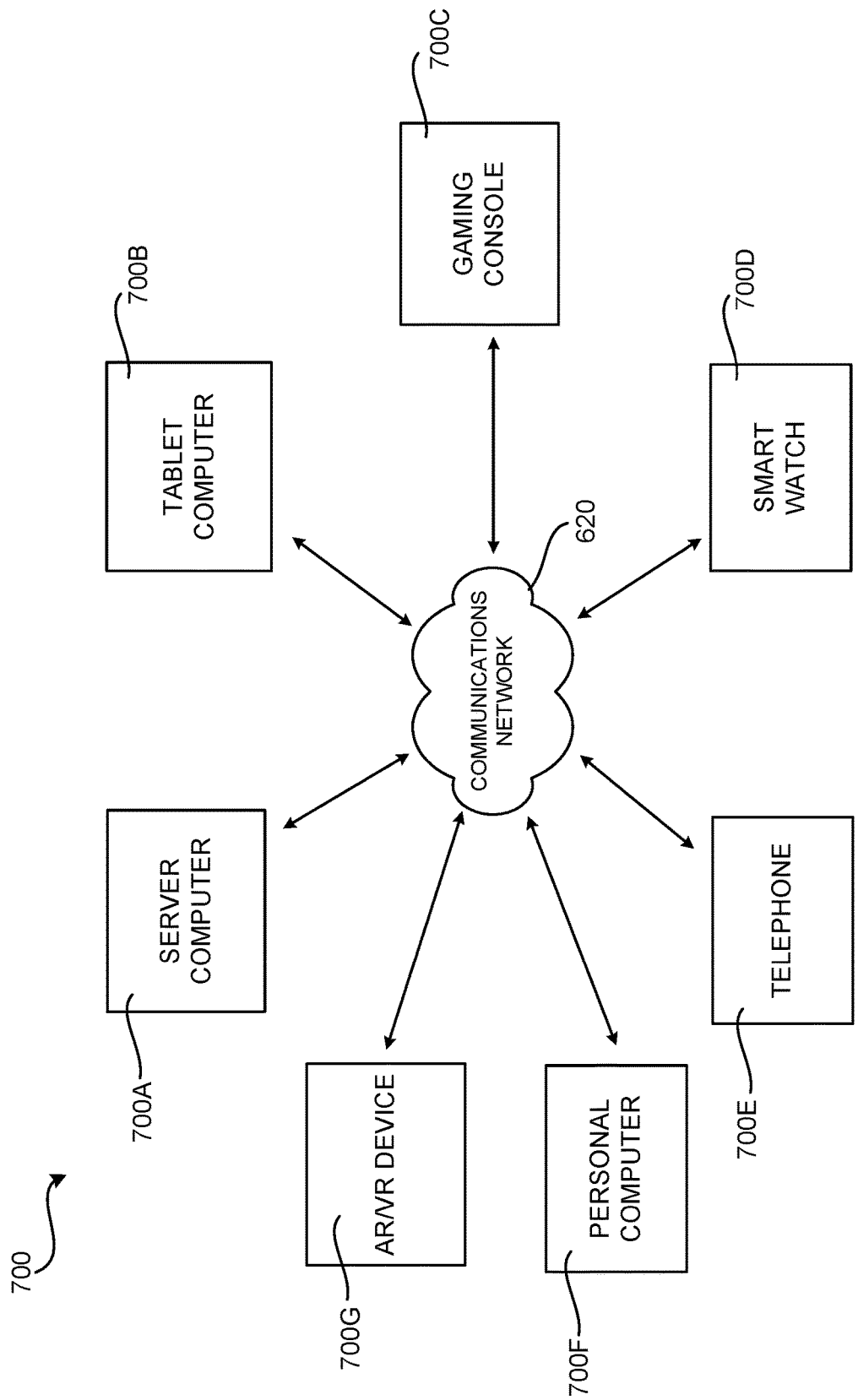
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various embodiments presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), or other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 6800A. These data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: receiving first data identifying one or more talking points associated with a presentation file; receiving second data identifying one or more topics recognized in user speech; identifying, based at least in part on the first data and the second data, one or more talking points associated with the presentation file not recognized in the user speech; and presenting a user interface (UI) comprising one or more UI elements displaying data identifying the one or more talking points associated with the presentation file not recognized in the user speech Clause 2. The computer-implemented method of clause 1, wherein the UI further comprises one or more UI elements displaying data identifying one or more talking points associated with the presentation file recognized in the user speech.

Clause 3. The computer-implemented method of any of clauses 1-2, further comprising providing a UI for defining the first data identifying the one or more talking points associated with the presentation file.

Clause 4. The computer-implemented method of any of clauses 1-3, wherein the UI for defining the defining the first data identifying the one or more talking points associated with the presentation file comprises one or more UI elements for associating one or more slides in the presentation file with the one or more talking points.

Clause 5. The computer-implemented method of any of clauses 1-4, wherein the UI further comprises one or more UI elements identifying a slide of a presentation file associated with a talking point not recognized in the user speech.

Clause 6. The computer-implemented method of any of clauses 1-5, further comprising: receiving a selection of one of the UI elements identifying a slide of the presentation file associated with a talking point not recognized in the user speech; and responsive to receiving the selection, displaying the slide of the presentation file associated with the talking point not recognized in the user speech.

Clause 7. The computer-implemented method of any of clauses 1-6, further comprising: receiving a voice command requesting to view a slide of a presentation file associated with a talking point; and responsive to receiving the voice command, presenting the slide of the presentation file associated with the talking point identified by the voice command.

Clause 8. A computer-readable storage medium having computer-executable instructions stored thereupon which, when executed by a computer, will cause the computer to: present a first user interface (UI), the first UI comprising a plurality of UI elements for receiving first data identifying talking points associated with a presentation file; receive the first data by way of the first UI; receive second data identifying topics recognized in user speech; identify talking points associated with the presentation file not recognized in the user speech based, at least in part, on the first data and the second data; and present a second UI comprising one or more UI elements that display data identifying the talking points associated with the presentation file not recognized in the user speech.

Clause 9. The computer-readable storage medium of clause 8, wherein the second UI further comprises UI elements displaying data identifying the talking points associated with the presentation file that have been recognized in the user speech.

Clause 10. The computer-readable storage medium of any of clauses 8-9, wherein the first UI further comprises one or more UI elements for associating one or more slides in the presentation file with the talking points.

Clause 11. The computer-readable storage medium of any of clauses 8-10, wherein the first UI further comprises a timeline identifying the one or more slides in the presentation file, and wherein a width and position of the UI elements for associating the one or more slides in the presentation file with the talking points define an association between a talking point and one or more slides in the presentation file represented on the timeline.

Clause 12. The computer-readable storage medium of any of clauses 8-11, wherein the second UI further comprises one or more UI elements identifying slides of the presentation file associated with talking points not recognized in the user speech.

Clause 13. The computer-readable storage medium of any of clauses 8-12, having further computer-executable instructions stored thereupon to: receive a selection of one of the UI elements identifying slides of the presentation file associated with a talking point not recognized in the user speech; and responsive to receiving the selection, display the slide of the presentation file associated with the talking point not recognized in the user speech.

Clause 14. The computer-readable storage medium of any of clauses 8-13, having further computer-executable instructions stored thereupon to: receive a voice command requesting to view a slide of a presentation file associated with one of the talking points; and responsive to receiving the voice command, present the slide of the presentation file associated with the talking point identified by the voice command.

Clause 15. A computing device, comprising: a processor; and a computer-readable storage medium having computer-executable instructions stored thereupon which, when executed by the processor, will cause the computing device to: present a first user interface (UI), the first UI comprising a plurality of UI elements for receiving first data identifying talking points associated with a presentation file; receive the first data by way of the first UI; receive second data identifying topics recognized in user speech; identify talking points associated with the presentation file not recognized in the user speech based, at least in part, on the first data and the second data; and present a second UI comprising one or more UI elements that display data identifying the talking points associated with the presentation file not recognized in the user speech.

Clause 16. The computing device of clause 15, wherein the second UI further comprises UI elements displaying data identifying the talking points associated with the presentation file that have been recognized in the user speech.

Clause 17. The computing device of any of clauses 15-16, wherein the first UI further comprises one or more UI elements for associating one or more slides in the presentation file with the talking points.

Clause 18. The computing device of any of clauses 15-17, wherein the first UI further comprises a timeline identifying the one or more slides in the presentation file, and wherein a width and position of the UI elements for associating the one or more slides in the presentation file with the talking points define an association between a talking point and one or more slides in the presentation file represented on the timeline.

Clause 19. The computing device of any of clauses 15-18, wherein the second UI further comprises one or more UI elements identifying slides of the presentation file associated with talking points not recognized in the user speech.

Clause 20. The computing device of any of clauses 15-20, wherein the computer-readable storage medium has further computer-executable instructions stored thereupon to: receive a selection of one of the UI elements identifying slides of the presentation file associated with a talking point not recognized in the user speech; and display the slide of the presentation file associated with the talking point not recognized in the user speech responsive to receiving the selection.

Based on the foregoing, it should be appreciated that technologies for providing an improved HCI for navigating a presentation file have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
presenting a first user interface (UI) for receiving first text that identifies a plurality of talking points which have been defined for a presentation file, wherein:
the first UI includes a timeline enabling a graphical association between one or more slides in the presentation file and each of the plurality of talking points; and
a width and a position of each of the plurality of talking points, represented on the timeline, define the graphical association between the one or more slides in the presentation file and each of the plurality of UI talking points;
converting, using a speech-to-text conversion component executing on a device, user speech into second text that identifies one or more topics discussed during a presentation of the presentation file;
comparing the first text and the second text;
identifying, based at least in part on the comparison, at least one talking point of the plurality of talking points which has been defined for the presentation file and that has not been discussed during the presentation of the presentation file; and
presenting a second UI comprising at least one UI element displaying data indicating that the at least one talking point has not been discussed.

2. The computer-implemented method of claim 1, further comprising:
determining, based at least in part on the comparison and at a time after the at least one talking point has been identified as not having been discussed, that the at least one talking point has been discussed during the presentation of the presentation file; and
updating the at least one UI element to indicate that the at least one talking point has been discussed.

3. The computer-implemented method of claim 1, wherein the second UI further comprises an additional UI element identifying a slide of the presentation file associated with the at least one talking point that has not been discussed during the presentation of the presentation file.

4. The computer-implemented method of claim 3, further comprising:
receiving a selection of the additional UI element identifying the slide of the presentation file associated with the at least one talking point that has not been discussed during the presentation of the presentation file; and
responsive to receiving the selection, displaying the slide of the presentation file associated with the at least one talking point that has not been discussed during the presentation of the presentation file.

5. The computer-implemented method of claim 1, further comprising:
receiving a voice command requesting to view a slide of the presentation file associated with the at least one talking point that has not been discussed during the presentation of the presentation file; and
responsive to receiving the voice command, presenting the slide of the presentation file associated with the at least one talking point that has not been discussed during the presentation of the presentation file.

6. A computer-readable storage medium having computer-executable instructions stored thereupon which, when executed by a computer, cause the computer to:

present a first user interface (UI), the first UI comprising a plurality of UI elements for receiving first text that identifies a plurality of talking points defined for a presentation file, wherein:
- the first UI includes a timeline enabling a graphical association between one or more slides in the presentation file and each of the plurality of UI elements; and
- a width and a position of each of the plurality of UI elements, represented on the timeline, define the graphical association between the one or more slides in the presentation file and each of the plurality of UI elements;

receive the first text by way of the first UI;
convert, using a speech-to-text conversion component, user speech into second text that identifies topics discussed during a presentation of the presentation file;
compare the first text to the second text;
identify, based at least in part on the comparison, at least one talking point of the plurality of talking points defined for the presentation file that has not been discussed during the presentation of the presentation file; and
present a second UI comprising at least one UI element displaying data indicating that the at least one talking point has not been discussed.

7. The computer-readable storage medium of claim 6, having further computer-executable instructions stored thereupon to:
determine, based at least in part on the comparison and at a time after the at least one talking point has been identified as not having been discussed, that the at least one talking point has been discussed during the presentation of the presentation file; and
update the at least one UI element to indicate that the at least one talking point has been discussed.

8. The computer-readable storage medium of claim 6, wherein the second UI further comprises an additional UI element identifying a slide of the presentation file associated with the at least one talking point that has not been discussed during the presentation of the presentation file.

9. The computer-readable storage medium of claim 8, having further computer-executable instructions stored thereupon to:
receive a selection of the additional UI element identifying the slide of the presentation file associated with the at least one talking point that has not been discussed during the presentation of the presentation file; and
responsive to receiving the selection, display the slide of the presentation file associated with the at least one talking point that has not been discussed during the presentation of the presentation file.

10. The computer-readable storage medium of claim 6, having further computer-executable instructions stored thereupon to:
receive a voice command requesting to view a slide of the presentation file associated with the at least one talking point; and
responsive to receiving the voice command, present the slide of the presentation file associated with the at least one talking point.

11. A computing device, comprising:
a processor; and
a computer-readable storage medium having computer-executable instructions stored thereupon which, when executed by the processor, cause the computing device to:
present a first user interface (UI), the first UI comprising a plurality of UI elements for receiving first text that identifies a plurality of talking points defined for a presentation file, wherein:
- the first UI includes a timeline enabling a graphical association between one or more slides in the presentation file and each of the plurality of UI elements; and
- a width and a position of each of the plurality of UI elements, represented on the timeline, define the graphical association between the one or more slides in the presentation file and each of the plurality of UI elements;

receive the first text by way of the first UI;
convert, using a speech-to-text conversion component, user speech into second text that identifies topics discussed during a presentation of the presentation file;
compare the first text to the second text;
identify, based at least in part on the comparison, at least one talking point of the plurality of talking points defined for the presentation file that has not been discussed during the presentation of the presentation file; and
present a second UI comprising at least one UI element displaying data indicating that the at least one talking point has not been discussed.

12. The computing device of claim 11, wherein the computer-readable storage medium has further computer-executable instructions stored thereupon to:
determine, based at least in part on the comparison and at a time after the at least one talking point has been identified as not having been discussed, that the at least one talking point has been discussed during the presentation of the presentation file; and
update the at least one UI element to indicate that the at least one talking point has been discussed.

13. The computing device of claim 11, wherein the second UI further comprises an additional UI element identifying a slide of the presentation file associated with the at least one talking point that has not been discussed during the presentation of the presentation file.

14. The computing device of claim 13, wherein the computer-readable storage medium has further computer-executable instructions stored thereupon to:
receive a selection of the additional UI element identifying the slide of the presentation file associated with the at least one talking point that has not been discussed during the presentation of the presentation file; and
display the slide of the presentation file responsive to receiving the selection.

* * * * *